US007346970B2

(12) United States Patent
Stöger

(10) Patent No.: US 7,346,970 B2
(45) Date of Patent: Mar. 25, 2008

(54) SETTING DEVICE FOR BLIND RIVET NUTS

(76) Inventor: Lorenz Stöger, Wöhlerweg 5, 82538 Geretsried (DE)

( * ) Notice: Subject to any disclaimer, the term of this patent is extended or adjusted under 35 U.S.C. 154(b) by 383 days.

(21) Appl. No.: 10/938,210

(22) Filed: Sep. 10, 2004

(65) Prior Publication Data

US 2005/0055816 A1 Mar. 17, 2005

(30) Foreign Application Priority Data

Sep. 12, 2003 (DE) ................................ 103 42 143

(51) Int. Cl.
*B23P 11/00* (2006.01)

(52) U.S. Cl. ........................... 29/243.521; 29/243.526; 72/391.2

(58) Field of Classification Search ............... 72/391.4, 72/391.8, 114, 391.2, 370.07; 29/243.521, 29/243.526, 243.519, 243.529
See application file for complete search history.

(56) References Cited

U.S. PATENT DOCUMENTS 4,368,631 A * 1/1983 Tanikawa .................. 72/391.8
4,574,612 A * 3/1986 Tanikawa .................. 72/391.8
5,131,255 A * 7/1992 Fushiya et al. ............ 72/391.8
6,067,839 A * 5/2000 Xie ........................... 72/391.8

* cited by examiner

*Primary Examiner*—Derris H. Banks
*Assistant Examiner*—Debra M Wolfe
(74) *Attorney, Agent, or Firm*—Greer, Burns & Crain, Ltd.

(57) ABSTRACT

The setting device for blind rivet nuts is characterized by an electric motor with a drive shaft which is arranged in a first housing part and connected via a transmission means to a tool housing part which is arranged in parallel with the drive shaft, a tool shaft which is arranged in the tool housing part and to which a tool is non-rotationally connected, a locking means with which the tool housing part and the tool shaft can be non-rotationally coupled, an anti-rotation means with which the tool shaft can be blocked against rotation, and a spindle means which in the rotation-blocked state of the tool shaft creates a relative axial movement between the tool shaft and the tool housing part. The locking means and the anti-rotation means are preferably formed by a joint coupling means.

15 Claims, 2 Drawing Sheets

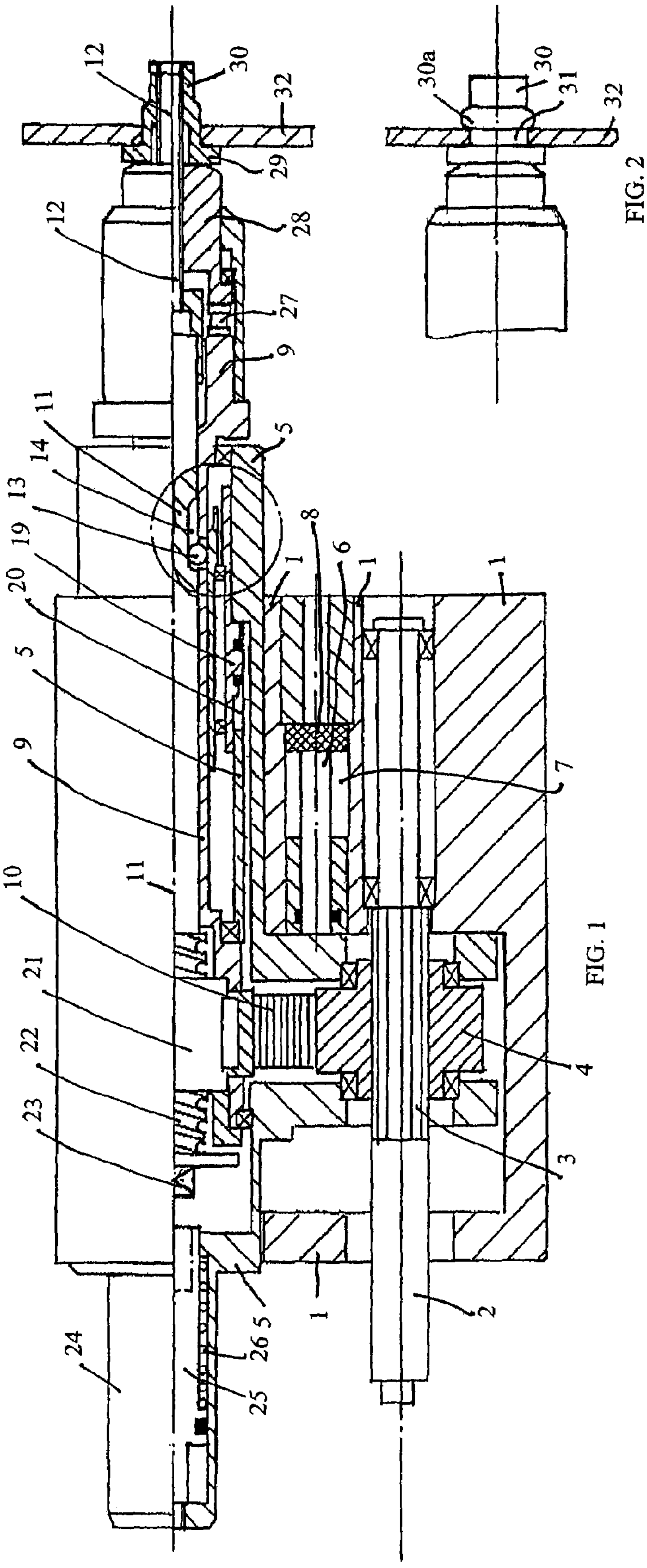
FIG. 1
FIG. 2
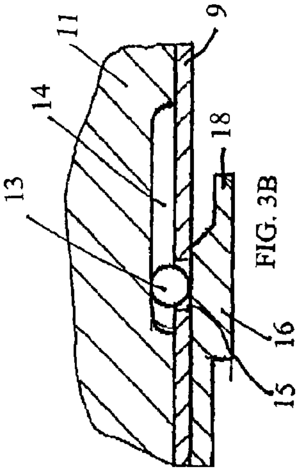
FIG. 3B
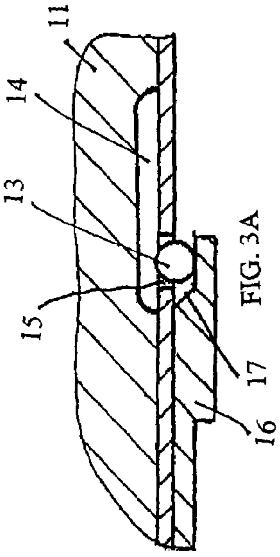
FIG. 3A

SETTING DEVICE FOR BLIND RIVET NUTS

FIELD OF THE INVENTION

The present invention relates to a setting device for blind rivet nuts. Such blind rivet nuts are inserted into holes of preferably thin-walled workpieces that cannot be provided with a thread, whereupon the blind rivet nuts pressed with a flange onto the workpiece are pulled such that a bead of the blind rivet nuts is formed at a desired deformation point at the workpiece side facing away from the flange, so that the blind rivet nuts are non-rotationally fastened to the workpiece. In subsequent assembling processes, screws can thus be screwed into the blind rivet nuts.

SUMMARY OF THE INVENTION

It is the object of the present invention to indicate a setting device for blind rivet nuts which is of a simple design and with which the blind rivet nuts can be reliably fastened in holes of thin-walled workpieces and with which such a reliable fastening can be checked.

The setting device of the invention has a single electric motor with a drive shaft that is positioned in a first housing part and is connected via a transmission means to a tool housing part which is laterally offset relative to the drive shaft and extends in parallel with the drive shaft, a tool shaft which is arranged in the tool housing part and has non-rotationally connected thereto a screw type tool which projects from the front end of the tool housing part, a locking means to which the tool housing part and the tool shaft can be coupled together in non-rotational fashion, or decoupled, an anti-rotation means with which the tool shaft can be blocked against rotation or can be released for rotation, and a spindle means which creates a relative axial movement between the tool shaft with the tool and the tool housing part when the tool shaft is blocked against rotation.

Moreover, the tool housing part is preferably movable by way of a piston/cylinder means in axial direction relative to the first housing part. Said piston/cylinder means preferably comprises two pneumatic piston/cylinder units, whose pistons are movable in opposite directions to advance the tool housing part with the tool shaft and the tool in axial direction towards the workpiece, or to retract it from the workpiece.

This configuration has the effect that the first housing part to which the electric motor is fastened can always remain stationary during setting of the blind rivet nuts so that only the relatively lightweight tool housing part has to be moved. The piston/cylinder means permits a slow and controlled insertion of the blind rivet nuts into the workpiece holes intended for this purpose, a lift of about 100 mm being here provided. While the one piston/cylinder unit advances the tool housing part, the screw type tool provided therein, as well as the blind rivet nuts received thereon, towards the workpiece in such a way that the blind rivet nut is inserted into the hole, the other piston/cylinder unit becomes operative to lift the whole arrangement again when e.g. the hole in the workpiece has been missed.

The transmission means with which the rotation of the drive shaft of the electric motor is transmitted to the tool housing part preferably includes a first belt pulley which is non-rotationally seated on the drive shaft, a second belt pulley which is non-rotationally connected to the tool housing part and may also be formed in that a section of the circumference of the tool housing part may integrally be provided with teeth, and a toothed belt which transmits the rotational force from the first belt pulley to the second belt pulley. With great advantage the first belt pulley is supported on the drive shaft in an axially displaceable manner, so that the whole transmission means can be reciprocated together with the tool housing part.

In one embodiment of the invention, the locking means with which the tool housing part can be locked with the tool shaft for joint rotation, preferably comprises a locking sleeve which surrounds the tool housing part and which can be reciprocated by an actuating means between a locking position and an unlocking position axially along the tool housing part, and a plurality of balls, each being seated with a ball section in cutouts in the wall of the tool housing part and either engaging with the remaining ball section radially on the inside into pockets of the tool shaft or, however, projecting radially to the outside. When the balls are partly seated in the windows of the wall of the tool housing part and the rest in the pockets of the tool shaft and when in said position they are held by the locking sleeve which covers the windows radially on the outside, the tool shaft and thus the screw type tool jointly rotate with the tool housing part. When the locking sleeve is retracted by the actuating means, preferably the piston of a pneumatic piston/cylinder means, in such a manner that the front end section of the locking sleeve, which leaves a radial space between the outer wall of the tool housing part, is arranged on the windows, the balls are preferably pressed by lateral inclined portions of the pockets of the tool shaft radially to the outside and out of engagement with the tool shaft, so that the tool housing part is freely rotatable relative to the tool shaft.

Moreover, an anti-rotation means is provided for the tool shaft, the anti-rotation means being seated in this embodiment preferably axially behind the tool shaft and being able to act on a polygonal means, for example a square of the tool shaft, in such a manner that the tool shaft is blocked.

In this state, the spindle means which acts between the tool housing part and the tool shaft becomes operative to create a relative axial movement between the tool housing part and the tool shaft. Said spindle means preferably consists of a nut with a helical groove for receiving the balls, the nut being firmly connected to the tool housing part, and of a spindle cooperating with the nut, which is a fixed component of the tool shaft. Several balls are arranged between said nut and said spindle.

Moreover, a rotatable support sleeve or rotatable support ring, from which the tool is projecting, is supported at the head end of the tool housing part.

The setting device according to the invention operates in the following way: First of all, a blind rivet nut is screwed onto the screw type tool in that the electric motor rotates the tool housing part and thus the screw tool which is non-rotationally coupled therewith. Said "screwing-on" of the blind rivet nuts will be completed when the flange of the blind rivet nut has reached the rotatable support sleeve at the head end of the tool housing part, the rotatability of the support sleeve preventing the blind rivet nut from being pressed with a great force against the support sleeve.

This is followed by the lift of the tool housing part, in which process the blind rivet nut is introduced into the hole of the workpiece until its flange is firmly seated on the workpiece.

Subsequently, the non-rotational coupling between the tool housing part and the tool shaft is released in that the locking sleeve is pneumatically retracted, so that the balls can exit out of the pockets of the tool shaft. The anti-rotation means becomes operative in that its cylinder is extended and grips over the square of the tool shaft, so that the shaft is no longer rotatable. When the electric motor now rotates the nut having a helical groove for receiving the balls, which nut pertains to the tool housing part, the tool shaft is moved back with the screw type tool axially from the workpiece, whereby the desired bead is formed at the desired deformation point of the blind rivet nut and the blind rivet nut is fastened with tensile strength and non-rotationally to the workpiece.

The applied torque can here be sensed and the pulling force with which the blind rivet nut has been anchored in the hole can be calculated on the basis thereof. The pulling path can be determined via the angle over which the nut with the helical groove for receiving the balls has been rotated.

Now it must be checked whether the blind rivet nut is non-rotationally seated in the workpiece. This is carried out through a torque check in which the tool housing part is again locked non-rotationally with the tool shaft, so that the two members rotate together. In this test, a specific torque, e.g. 15 Nm, is applied and when the blind rivet nut does not rotate, it is correctly fastened to the workpiece. In this torque check, the anti-rotation means of the tool shaft is of course released, and there is no relative axial movement between the tool housing part and the screw type tool.

In a particularly preferred alternative embodiment of the invention, the anti-rotation means and the locking means are formed by a joint coupling means by which in a first axial position of a coupling element the tool shaft can be non-rotationally coupled with the rotatable tool housing part and in a second axial position of the coupling element with a stationary housing part. This simplifies not only the construction of the setting device, but the non-rotational connection of the tool shaft with the rotatable tool housing part can directly be established in any rotational position of the tool shaft, whereas in the above-indicated first embodiment of the invention the pockets of the tool shaft must match with the positions of the balls.

In further details it is suggested that the tool shaft passes with a polygonal extension, preferably a square extension, displaceably through a correspondingly shaped through hole of the coupling element.

The coupling element is preferably connected to a pneumatic piston for joint axial displacement. Moreover, it is intended that the coupling element comprises a front conical coupling surface which in the first axial position of the coupling element is pressed against a correspondingly conical surface of the rotatable tool housing part, and a rear conical coupling surface which in the second axial position of the coupling element is pressed against a correspondingly conical surface of a stationary housing part.

Moreover, it is with great advantage that the support sleeve which is arranged at the head end of the tool housing part is non-rotationally lockable by means of a pneumatic piston with the rotatable tool housing part. This locking action is performed during torque checking and may also take place prior to the threading of the blind rivet nuts. When the blind rivet nut which is inserted in the hole of the workpiece is pulled, the support sleeve is decoupled from the rotatable tool housing part.

BRIEF DESCRIPTION OF THE DRAWINGS

Further details of the invention become apparent from the following description of a preferred embodiment of the setting device and from the drawing, which shows in a substantially schematic way in FIG. 1 a partly cut side view of a first embodiment of the setting device of the invention;

FIG. 2 a side view of the head end of the device according to FIG. 1 in a state in which a blind rivet nut is fastened;

FIGS. 3A and 3B the locking means of the setting device according to FIG. 1 in the free and locked state, in longitudinal section;

DETAILED DESCRIPTION OF PREFERRED EMBODIMENT

Figure 4:
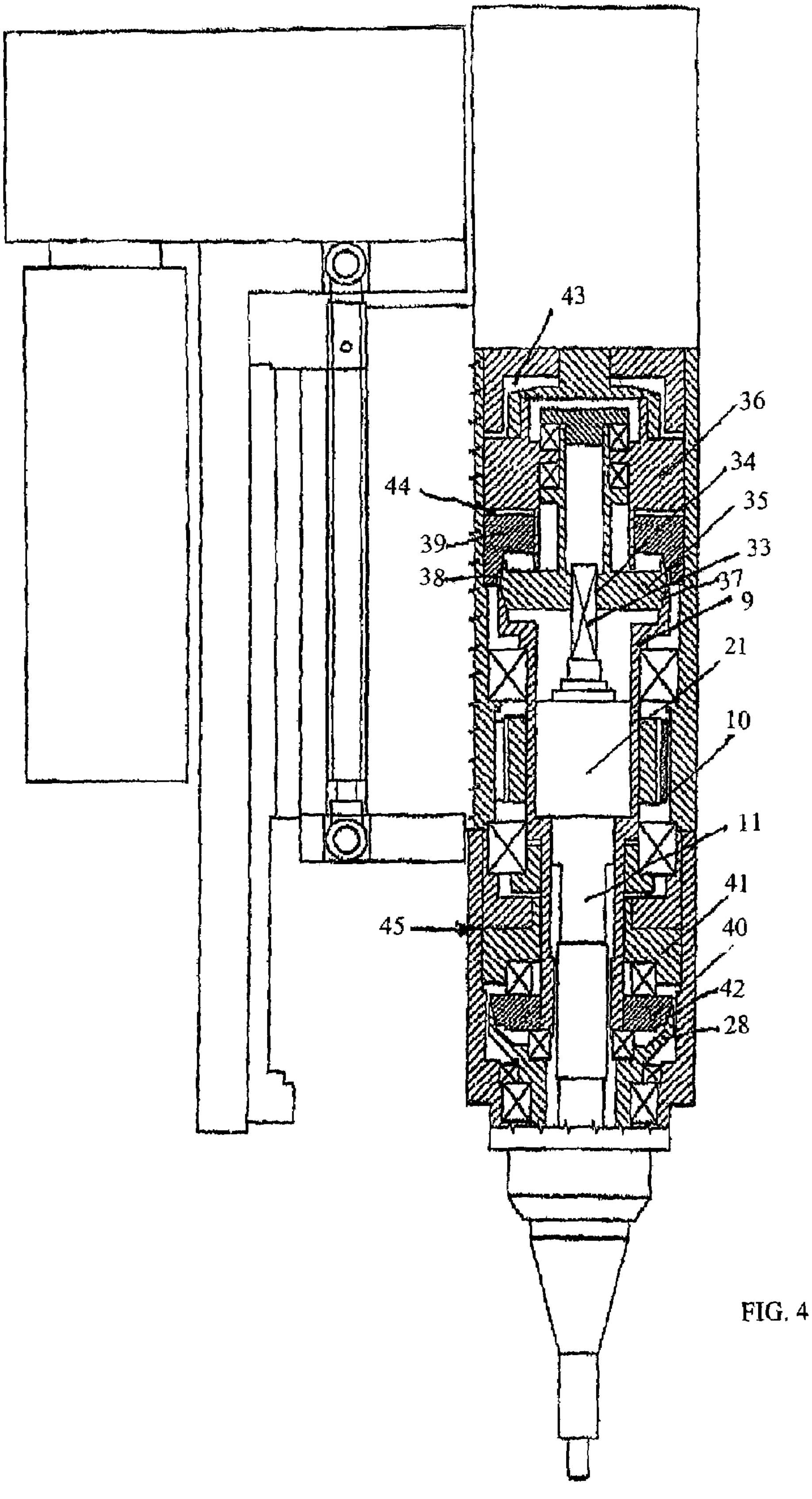
FIG. 4 a partly cut side view of a second embodiment of the device of the invention.

Reference is first made to FIG. 1. A first housing part 1 has rotatably supported therein a drive shaft 2 of an electric motor, which is not shown in the figure. The electric motor is arranged at an end of the drive shaft 2, which is the left one in the figure, and is fastened to the housing part 1.

The drive shaft 2 has a section 3 which has e.g. the sectional shape of a polygon. Said section 3 has seated thereon a first belt pulley 4, the bore of which has an inner contour matching with the outer contour of the section 3 so that the belt pulley 4 is non-rotationally connected to the drive shaft 2, but is seated in a longitudinally displaceable manner on section 3 thereof.

A further housing part 5 is seated laterally next to the first housing part 1, the further housing part 5 being adapted to be reciprocated with the piston rod 6 of a pneumatic piston 8, which is seated in a cylinder 7, together with the first belt pulley 4 in the longitudinal direction of the drive shaft 2.

In the second housing part 5, a tool housing part 9 is rotatably seated and has non-rotationally connected thereto a second belt pulley. A toothed belt 10 transmits the rotational movement of the drive shaft 2 from the belt pulley 4 to the belt pulley of the tool housing part 9.

Inside the tool housing part 9, a tool shaft 11 is concentrically seated and is non-rotationally connected at its end, which is the right one in the figure, to a screw type tool 12. The tool housing part 9 and the tool shaft 11 can be non-rotationally coupled together by balls 13 if said balls 13 engage with a respective ball section into lateral pockets 14 of the tool shaft 11, as shown in FIGS. 1 and 3B.

The balls 13 are partly seated in windows 15 in the wall of the tool housing part 9 both in the state locked for joint rotation of the tool housing part 9 with the tool shaft 11 and in the unlocked state shown in FIG. 3A.

The area of the slots or windows 15 is covered radially on the outside by a locking sleeve 16 that at its end section, which is the right one in the figure, and due to a step 17, comprises a section 18 having a larger inner diameter so that a space remains between the inner wall of the section 18 and the outer wall of the tool housing part 9.

The locking sleeve 16 has an outer ring piston 19 formed thereon, which is seated in a pneumatic cylinder chamber 20, so that the piston 19 can be moved axially with the locking sleeve 16 on the tool housing part 9. When the locking sleeve 16 is advanced in this process to the right side from the retracted axial position shown in FIG. 3A, the balls 13 are pressed on the inclined portions 17 of the locking sleeve 16 radially inwards into engagement with the pockets 14 and are held by the inner surface of the now advanced locking sleeve 16 in said position, as shown in FIG. 3B, whereby the rotation of the tool housing part 9 is transmitted to the tool shaft 11.

When the locking sleeve 16 is again retracted into the position shown in FIG. 3A, the balls 13 are pressed out by inclined side surfaces of the pockets 14 into the unlocking position.

The tool housing part 9 is non-rotationally connected to a nut 21 with a helical groove for receiving the balls, the nut 21 having concentrically seated therein a spindle 22 cooperating with the nut 21, which is integrally formed with the tool shaft 11 or non-rotationally connected thereto. At its end, which is the left one in FIG. 1, the tool shaft 11 is non-rotationally connected to a square 23 for preventing rotation thereof. For blocking said square a cylinder 24 is provided at the left end of the housing 5 and has arranged therein a piston 25 which can be retracted and extended and which can be brought pneumatically into engagement with the square 23 against the force of a helical spring 26. In this state, the rotation of the tool shaft 11 is blocked so that during rotation of the nut having a helical groove for receiving the balls an axial movement of the tool shaft 9 with the screw type tool 12 takes place relative to the tool housing part 9 via the spindle cooperating with the nut.

At the front end of the tool housing part 9, which is the right one in the figure, a support sleeve 28 is supported via an axial bearing 27 and contacts a flange 29 of a blind rivet nut 30 when said blind rivet nut 30 is screwed onto the screw type tool 12 in a state of the setting device in which the tool housing part 9 rotates together with the tool shaft 11 and the screw type tool 12.

When the locking sleeve 16 is subsequently moved to the left side in such a way (as shown in FIG. 1) that the balls 13 pass into the state shown in FIG. 3A and the piston 25 is extended and non-rotatably holds the square 23, the tool shaft 11 is pulled with the screw type tool 12 (in the illustration of FIG. 1) to the left side in the running state of the drive shaft 2, whereby the blind rivet nut 30 is compressed on the edge of the hole 31 of the workpiece 32 such that a bead 30*a* is formed. The workpiece 32 is thus clamped between the flange 29 and the bead 30*a* that the blind rivet nut 30 is non-rotationally seated in the hole 31.

FIG. 4 shows an alternative embodiment of the invention, which is particularly preferred and substantially differs from the first embodiment in that the anti-rotation means and the locking means are formed by a joint coupling means, and that the support sleeve is lockable with the rotatable tool housing part. The other components correspond to those of the first embodiment and are marked with the same reference numerals.

At its end that is the upper one in FIG. 4, the tool shaft 11 has a square extension 33 which displaceably passes through a correspondingly shaped through hole 34 of a coupling element 35 which is rotatably connected for joint axial movement with a pneumatic piston 36. The coupling element 35 is provided on its front end portion with a first conical coupling surface 37 and on its rear end portion (the upper one in FIG. 4) with a coupling surface 38, which is also conical.

When the pneumatic piston 36 is moved downwards by the supply of compressed air into the compressed air chamber 43, which is the upper one in the figure, the coupling element 35 is pressed with its conical coupling surface 37 against a correspondingly conical surface of the rotatable tool housing part 9, whereby the tool shaft 11 is non-rotationally coupled with the rotatable tool housing part 9.

Due to the supply of compressed air into a lower compressed air chamber 44, the coupling element 35 is moved upwards and pressed with the conical coupling surface 38 against a corresponding surface of a stationary housing part 39, whereby the tool shaft 11 is blocked against rotations.

The support sleeve 28 can be connected in a similar way by a further coupling element 40 in non-rotatable fashion to the rotatable tool housing part 9 in that a pneumatic piston 41 which has rotatably connected thereto the coupling element 40 presses said element with its conical circumferential surface 42 against a corresponding conical inner surface of the support sleeve 28. The compressed-air inlet is designated in FIG. 4 with reference numeral 45. The coupling element 40 is here seated in an axially displaceable manner on the rotatable tool housing part 9 and is non-rotatably connected thereto.

When the torque is checked, the support sleeve 28 is non-rotatably locked with the rotatable tool housing part 9 whereas it is decoupled during pulling of the blind rivet nut.

The invention claimed is:

1. A setting device for blind rivet nuts, comprising an electric motor with a drive shaft which is arranged in a first housing part and connected via a transmission means to a rotatable tool housing part which is arranged in parallel with the drive shaft, a tool shaft which is arranged in the tool housing part and has non-rotationally connected thereto a screw type tool, a locking means with which the tool housing part and the tool shaft can be non-rotationally coupled, an anti-rotation means with which the tool shaft can be blocked against rotation, and a spindle means which in the rotation-blocked state of the tool shaft creates a relative axial movement between the tool shaft and the tool housing part.

2. The setting device according to claim 1, further comprising a piston/cylinder means with which the tool housing part is axially movable relative to the first housing part.

3. The setting device according to claim 1, wherein the transmission means comprises a first belt pulley connected to the drive shaft which is connected via a toothed belt to a second belt pulley connected to the tool housing part.

4. The setting device according to claim 3, wherein the first belt pulley is arranged on a section of the drive shaft in an axially displaceable manner.

5. The setting device according to claim 1, wherein the spindle means comprises a nut with a helical groove for receiving balls and a spindle cooperating with said nut.

6. The setting device according to claim 5, wherein the nut having a helical groove for receiving the balls is firmly connected to the tool housing part while the tool shaft comprises the spindle cooperating with the nut.

7. The setting device according to claim 1, wherein a head end of the tool housing part has rotatably supported thereon a support sleeve from which the screw type tool projects.

8. The setting device according to claim 1, wherein a torque check can be carried out by means of the one electric motor.

9. The setting device according to claim 1, wherein the locking means comprises a locking sleeve which surrounds the tool housing part and which is axially displaceable by an actuating means between a locking position and an unlocking position, and balls which are seated with a ball section in windows in the wall of the tool housing part and which, with the remaining ball section, either engage radially on the inside into pockets of the tool shaft or radially project to the outside.

10. The setting device according to claim 1, wherein the anti-rotation means is a piston/cylinder means which is mounted on a stationary housing part and with which a polygonal means of the tool shaft can be blocked against rotation.

11. The setting device according to claim 1, wherein a coupling element is axially displaceable on the tool shaft and the locking means is comprised of mating coupling surfaces on the coupling element and the rotatable tool housing part which can be engaged in a first axial position of the coupling element and the anti-rotation means is comprised of mating coupling surfaces on the coupling element and a stationary housing part which can be engaged in a second axial position of the coupling element.

12. The setting device according to claim 11, wherein the tool shaft displaceably passes with a polygonal extension through a correspondingly shaped through hole of the coupling element.

13. The setting device according to claim 11, wherein the coupling element is connected to a pneumatic piston for axial displacement.

14. The setting device according to claim 11, wherein the coupling element comprises a front conical coupling surface which in the first axial position can be pressed against a correspondingly conical surface of the rotatable housing part, and a rear conical coupling surface which in the second axial position can be pressed against a corresponding conical surface of a stationary housing part.

15. The setting device according to claim 7, wherein the support sleeve is non-rotationally lockable with the rotatable tool housing part by means of a further coupling element which is actuated by a pneumatic piston.

* * * * *

UNITED STATES PATENT AND TRADEMARK OFFICE

CERTIFICATE OF CORRECTION

PATENT NO. : 7,346,970 B2
APPLICATION NO. : 10/938210
DATED : March 25, 2008
INVENTOR(S) : Lorenz Stöger It is certified that error appears in the above-identified patent and that said Letters Patent is hereby corrected as shown below:

On the Title Page Item (30) - Foreign Application Priority Data

Delete "Sep. 12, 2003 (DE) ..........................103 42 143" and
Insert --Sep. 12, 2003 (DE) ..........................103 42 143.2--.

Signed and Sealed this

Fifteenth Day of July, 2008

JON W. DUDAS
*Director of the United States Patent and Trademark Office*